A. G. WITT.
SHOCK ABSORBER.
APPLICATION FILED DEC. 11, 1920.

1,392,386.

Patented Oct. 4, 1921.
2 SHEETS—SHEET 2.

INVENTOR
ARTHUR G. WITT
By Fetherstonhaugh Co
attys.

A. G. WITT.
SHOCK ABSORBER.
APPLICATION FILED DEC. 11, 1920.

1,392,386.

Patented Oct. 4, 1921.
2 SHEETS—SHEET 1.

INVENTOR
ARTHUR G. WITT
By Fetherstonhaugh & Co.
Attys.

UNITED STATES PATENT OFFICE.

ARTHUR GEORGE WITT, OF HAMILTON, ONTARIO, CANADA.

SHOCK-ABSORBER.

1,392,386. Specification of Letters Patent. Patented Oct. 4, 1921.

Application filed December 11, 1920. Serial No. 429,937.

*To all whom it may concern:*

Be it known that I, ARTHUR GEORGE WITT, a subject of the King of Great Britain, residing in the city of Hamilton, county of Wentworth, Province of Ontario, Dominion of Canada, have invented certain new and useful Improvements in Shock-Absorbers, of which the following is a specification.

My invention relates to improvements in shock absorbers for vehicles with particular reference to the general type employing a pneumatic cushion, and the object of the present invention is to devise a shock absorber of this type which will be strong and durable and which will be universally adaptable for use under the many widely different conditions in which shock absorbers may be employed.

My invention consists essentially of two cylindrical members telescoping one within the other and adapted to be secured respectively to the opposing portions of a vehicle, and a pneumatic cushion and a metallic spring cushion situated between the cylindrical members, all as hereinafter more particularly described and illustrated in the accompanying drawings in which:—

Like characters of reference indicate corresponding parts in the different views.

1 is the casing of the shock absorber which comprises the upper cylindrical member 2 open at its lower end and into which the lower cylindrical member 3 enters telescopically.

Figure 2:
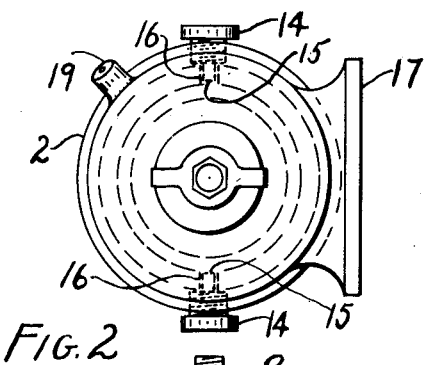
Fig. 2 is a plan view of Fig. 1.
Figure 1:
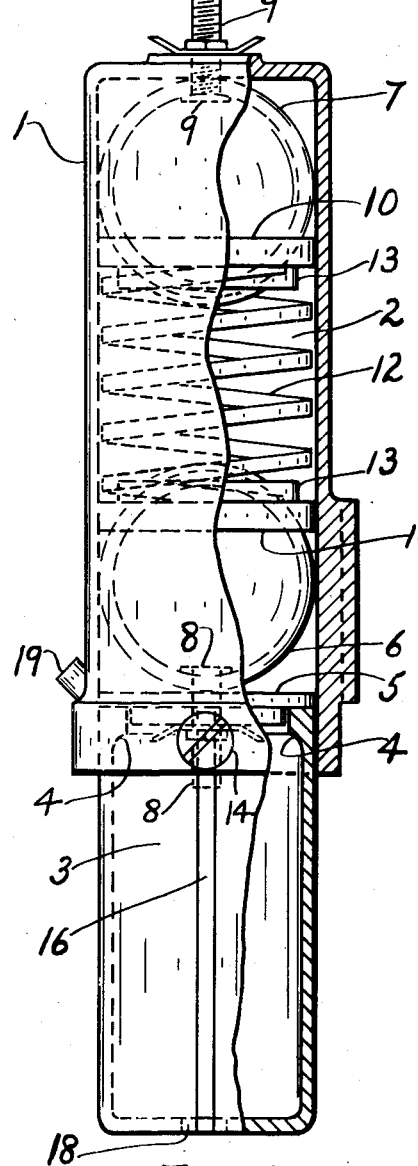
Figure 1 is a side elevation of one form in which my invention may be constructed, the outer shell being partly broken away to show the interior construction.

Referring first to Figs. 1 and 2,

The upper end of the lower member 3 is provided with a shoulder or flange 4 and 5 is an annular disk supported thereby.

6 and 7 are balls carried within the upper cylindrical member 2, the lower ball 6 being supported by the disk 5.

8 and 9 are suitable valve connections for inflating the balls 6 and 7, respectively, the connection 8 passing through the disk 5 and the connection 9 through the top end of the member 2.

Figure 7:
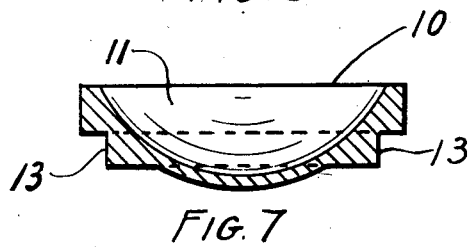
Fig. 7 is a central section of a bearing plate used in Fig. 1.

10, 10 are upper and lower bearing plates slidably mounted within the upper cylindrical member 2 (see Figs. 1 and 7) and are suitably cupped at 11 to engage the balls 6 and 7.

12 is a coil spring situated between the bearing plates 10, 10 and is held centrally within the member 2 by engagement of its ends with the annular shoulders 13 on these bearing plates.

14 are threaded screws engaging orifices in the lower end of the upper member 2. The inner ends 15 of these screws are adapted to engage vertical slots 16 which extended into proximity to the upper end of the lower member 3. These screws thus constitute guides and stops for limiting the outward movement of the upper and lower cylindrical members.

17 is a boss carried by the upper cylindrical member 2 to be used in attaching the same in operative position and the lower cylindrical member 3 is provided with an orifice 18 at its lower end for a similar purpose.

19 is an oiler.

Figure 4:
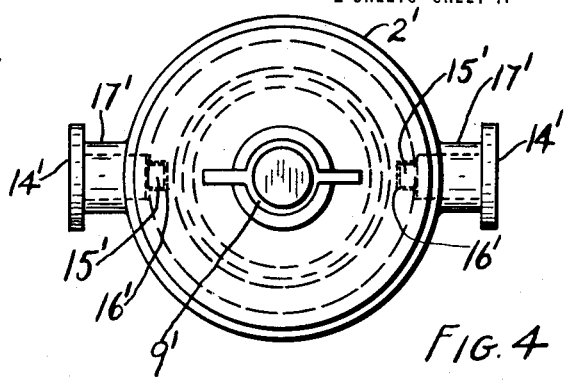
Fig. 4 is a plan view of Fig. 3.
Figure 3:
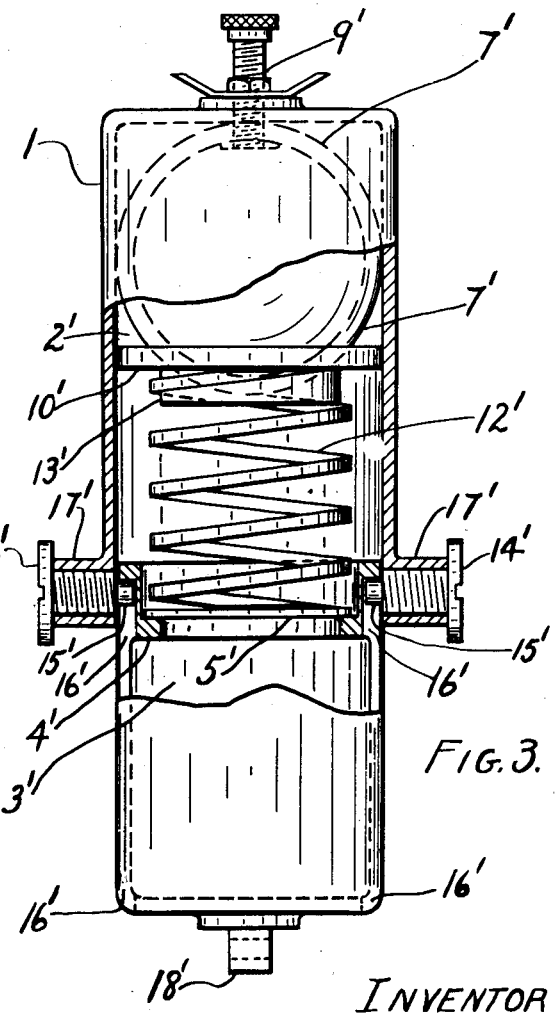
Fig. 3 is a side elevation of a modified form of construction, the outer shell being partly broken away to show the interior construction.

Referring now to the modification illustrated in Figs. 3 and 4.

The upper end of the lower member $3^1$ is provided with a shoulder $4^1$ upon which is supported an annular disk $5^1$.

A single ball $7^1$ is carried at the upper end of the upper cylindrical member $2^1$ and is provided with inflating connections $9^1$.

A single cupped bearing plate $10^1$ is employed and a coil spring $12^1$ is situated between the disk $5^1$ and bearing plate $10^1$, being centrally located by its upper end engaging the shoulder $13^1$ on the bearing plate $10^1$ and its lower end guided by the walls of the lower member $3^1$.

Threaded screws $14^1$ extend through bosses $17^1$ formed integrally with the upper cylindrical member $2^1$ and the inner ends $15^1$ of these screws engage vertical slots $16^1$ in the lower cylindrical member $3^1$ in a similar manner to that previously described.

The bosses $17^1$ constitute means for securing the upper member $2^1$ in position and a boss $18^1$ having an orifice therethrough is carried by the lower member $3^1$ for a similar purpose.

Figures 5, 6:
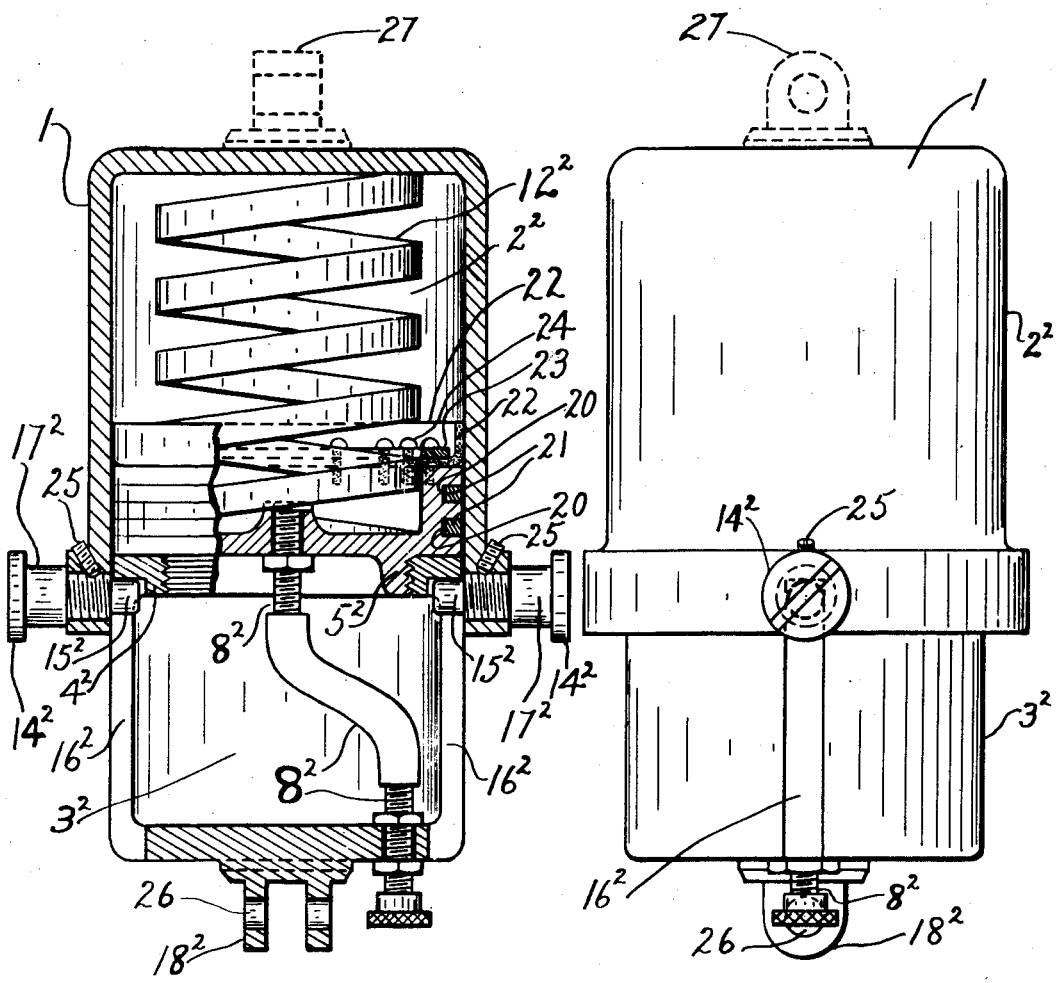
Fig. 5 is an elevational view, partly in section, of a further modified construction, parts being broken away to show the interior construction.
Fig. 6 is a side elevation of Fig. 5.

Referring now to the further modification illustrated in Figs. 5 and 6.

In this construction the shoulder $4^2$ at the upper end of the lower cylindrical member $3^2$ is threaded at its inner edge, this threaded shoulder being engaged by a cover or piston head $5^2$ which closes the upper end of the lower member.

The peripheral face of the piston head $5^2$ is provided with grooves 20 into which are fitted the piston rings 21.

A flexible cup washer 22 of leather or such material is suitably secured to the top of the piston head $5^2$, as by the annular ring 23 and the screws 24.

The coil spring $12^2$ is situated within the upper member $2^2$ and engages at its two ends respectively the top of the member $2^2$ and the piston head $5^2$. The lower end of the spring extends into the recessed upper face of the piston head $5^2$ and is thus held centrally located.

$8^2$ indicates suitable flexible air connections for admitting air under pressure into the space above the piston $5^2$.

$14^2$ are threaded screws extending through orifices in the lower end of the upper member $2^2$ the inner ends $15^2$ of which engage vertical slots $16^2$ in the lower member $3^2$.

25 are grub screws for locking the screws $14^2$ in position.

$17^2$ are journal portions formed on the screws $14^2$ to provide means for mounting the upper member $2^2$ in position.

$18^2$ is a boss having an orifice 26 extending therethrough to provide means for mounting the lower member $3^2$ in position.

27 indicates, in dotted lines, a boss or lug formed on the top of the upper member $2^2$. This is an alternative method of mounting the upper member in position.

The construction and operation of my invention is as follows:

In the application of shock absorbers to the many widely different types and forms of vehicles it is of course necessary to construct them in many different sizes and proportions, each vehicle requiring a particular size of absorber. Some require a short stroke and some a long stroke and it has been found, that when the pneumatic cushion used consists of a ball only that it was difficult to modify the proportions of the absorber satisfactorily, as an increase in the length of stroke entailed a corresponding increase in the diameter of the absorber and vice versa, unless a series of balls are used which has not proved satisfactory in practice.

It has been with a view of overcoming this difficulty and rendering the device more universally adaptable to all types of vehicles that my present improvements have been devised.

Considering the type illustrated in Figs. 1 and 2. This employs two balls separated by a coil spring 12 and by varying the length of this spring, the stroke of the absorber may be arranged as desired without increasing the diameter.

The type illustrated in Figs. 3 and 4 employs one ball only and will permit of any desired length of stroke while still retaining the use of the ball cushion.

The type illustrated in Figs. 5 and 6 does not use a ball cushion but provides a pneumatic cushion through the medium of the air inclosed within the space above the piston $5^2$. The flexible connections $8^2$ provide a means of passing air under pressure into this space.

In this type the piston head would probably be covered with a heavy oil to prevent leakage of air past the piston.

A coil spring $12^2$ is used in combination with the air cushion and in this form the absorber will be suitable for very heavy duty, such as on railway carriages and street cars etc.

The coil spring could be omitted from this construction if desired and the air cushion only employed for lighter duty.

It will be apparent from the constructions illustrated that the balls 6, 7, $7^1$ constitute pneumatic cushions while the springs 12, $12^1$ and $12^2$ constitute metallic spring cushions.

From the foregoing it will be seen that I have devised improvements in shock absorbers which will render my device universally suitable for use on any type or size of vehicle.

Many modifications may be made in my invention without departing from the spirit of the same or the scope of the claims and the forms illustrated are to be taken as illustrative only and not in a limiting sense.

For instance, various methods of mounting the upper and lower cylindrical members in position on the vehicle may be employed and I do not confine my invention to the specific forms illustrated.

Further while I have illustrated the use of ball cushions it may be that other forms of pneumatic cushions will be more suitable in some cases.

Also various methods of inflating the pneumatic cushions other than the specific connections shown may be employed.

What I claim as my invention is:

1. A shock absorber, comprising inner and outer cylindrical members adapted to be secured to the opposing portions of a vehicle and telescoping one within the other, a ball cushion within the outer telescoping member at each end thereof, a coil spring separating the ball cushions and a cupped bearing plate situated between each end of the coil spring and the adjacent ball cushion.

2. A shock absorber, comprising inner and outer cylindrical members adapted to be secured to the opposing portions of a vehicle and telescoping one within the other, a ball cushion within the outer telescoping member at each end thereof, a coil spring separating the ball cushions and a cupped bearing plate situated between each end of the coil spring and the adjacent ball cushion, the ends of the coil spring engaging flanges on the cupped bearing plates.

3. A shock absorber, comprising inner and outer cylindrical members adapted to be secured to the opposing portions of a vehicle and telescoping one within the other, a pneumatic cushion and a metallic spring cushion situated within the outer cylindrical member and co-acting between the telescoping members, studs carried by the outer cylindrical member, the inner cylindrical member having slots into which the said studs extend.

4. A shock absorber, comprising inner and outer cylindrical members adapted to be secured to the opposing portions of a vehicle and telescoping one within the other, a pneumatic cushion and a metallic spring cushion situated within the outer cylindrical member and co-acting between the telescoping members, the inner telescoping member provided with slots, studs carried by the outer member and engaging the slots in the inner member for controlling the relative displacement of the two telescoping members.

5. A shock absorber, comprising inner and outer cylindrical members adapted to be secured to the opposing portions of a vehicle and telescoping one within the other, a pneumatic cushion and a metallic spring cushion situated within the outer cylindrical member and co-acting between the telescoping members, the inner telescoping member provided with slots, studs carried by the outer member and engaging the slots in the inner member for controlling the relative displacement of the two telescoping members and for limiting their outward movement.

ARTHUR GEORGE WITT.

Witnesses:
JOHN G. HAYWARD,
NORIEEN COLES.